United States Patent [19]
Gaccetta

[11] 3,811,206
[45] May 21, 1974

[54] DEVICE FOR TEACHING ALPHABETIC ORDER

[76] Inventor: Richard Gaccetta, 6646 E. 17th Ave., Denver, Colo. 80220

[22] Filed: Mar. 5, 1973

[21] Appl. No.: 338,175

[52] U.S. Cl. .................. 35/35 H, 35/31 F, 35/70, 35/71, 35/73
[51] Int. Cl. .......................................... G09b 1/06
[58] Field of Search ...... 35/31 R, 31 D, 31 F, 31 G, 35/35 R, 35 H, 35 J, 69, 70, 71, 72, 73

[56] References Cited
UNITED STATES PATENTS
2,415,342  2/1947  Donner ............................... 35/69

Primary Examiner—Wm. H. Grieb

[57] ABSTRACT

A device designed to provide the elements of learning techniques, while affording the added benefits of holding the attention of small children, is disclosed herein.

The "Funzie game," by means of pre-determined positions of each of the movable blocks in the game, allows small children to rapidly absorb the basics of counting and spelling, as it becomes apparent to the child that each block in both rows of the board will fit on only one position (the correct one), thus reducing errors and uncertainty, while allowing the child to learn by trial and error methods.

2 Claims, 3 Drawing Figures

PATENTED MAY 21 1974 3,811,206

DEVICE FOR TEACHING ALPHABETIC ORDER

BACKGROUND OF THE INVENTION

The funzie game was developed as an improved means of teaching small children the basics of alphabet, spelling and counting, the theory behind the game itself being the feature that each block has only one correct location on the board. The method by which this is accomplished will be explained in the detailed description of the disclosure.

OBJECTS OF THE PRESENT INVENTION

The primary object is to incorporate a correllation between numerals and the 26 letters of the alphabet, so that the pre-school child may easily assimilate the relationship between the latters and numerals in their correct sequential order.

Another object is to establish the "one only correct" feature in the game so that the child, thru trial and error plays, will learn by simple repetition the correct location of each of the letter blocks.

DETAILED DESCRIPTION

Figure 1:
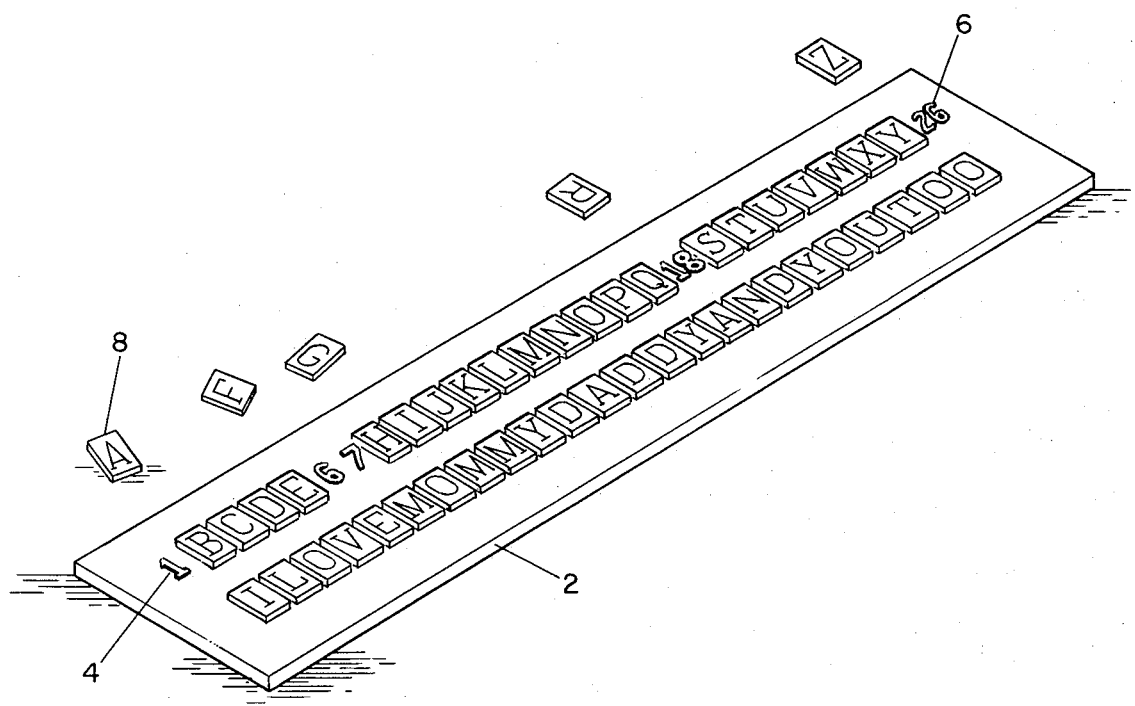
FIG. 1 is a three-dimensional drawing of the game device, showing some of the letter blocks removed from their board position.

The present invention, fabricated according to the concepts of the disclosure, is described as follows:

FIG. 1 shows the complete device, consisting of the basic board (reference numeral 2), which incorporated two rows of raised numerals affixed to it's upper surface, beginning with numeral 1 (reference numeral 4), thru numeral 26 (reference numeral 6), which completes the upper row. Correspondingly, a set of 26 blocks, the first with the letter "A" imprinted of it's upper face (reference numeral 8), progressively thru the alphabet to the last block imprinted with the letter "Z" on it's upper face.

Figure 2:
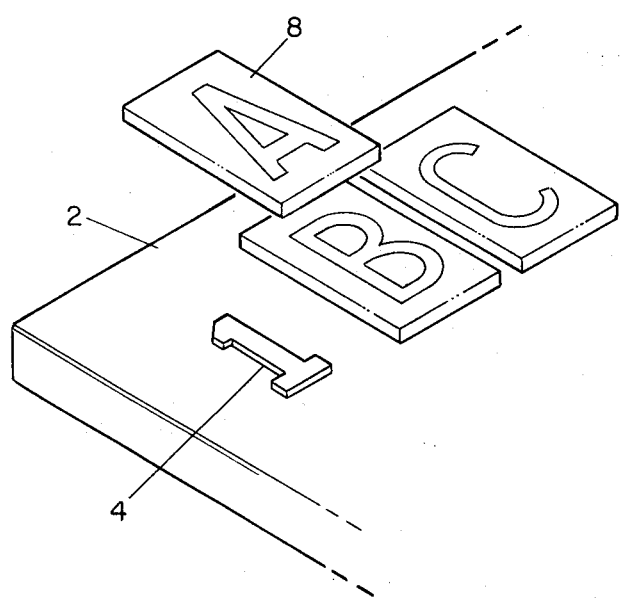
FIG. 2 is a three-dimensional detail view of a portion of the board.
Figure 3:
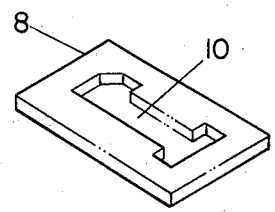
FIG. 3 is a three-dimensional detail view of the underside of one of the blocks.

As shown in FIG. 2, the letter "A" block (8) fits into it's proper place on the board over the raised numeral "1" (4). FIG. 3 shows the reverse, or underside of the same block with the itaglio recess (10), permitting the block to be fitted in this location only.

In like manner, the letter "B" block embodies the recess in it's underside corresponding to the raised numeral "2" beneath it, and so on, thru to the end of the alphabet in the first row.

The lower row on the board has a series of 24 similar raised numerals from 27 thru 50, which accomodate a second corresponding set of letter blocks which, when placed in their respective positions, spell out a sentence as shown in the lower row of the board in FIG. 1 — These blocks, however, cannot be interchanged with those in the upper (alphabet) row, because of the differing numerals beneath them, but similar sets of letter blocks with different sentences may be provided as a part of the game components, in a contrasting color to avoid confusing the blocks.

The board and blocks may be made of a plastic material, and furnished in bright contrasting colors.

What is claimed for the present invention is;

1. An educational device for teaching the basics of the alphabet comprising:
    a surface having a predetermined sequence of raised numerals thereon;
    a set of blocks, each block bearing on its upper base a letter of the alphabet and on its lower face a recess in the form of a numeral;
    each said recess mating with at least one of said raised numerals;
    whereby when said blocks are properly positioned over their mating raised numerals the letters will be arranged according to said predetermined sequence.

2. The educational device of claim 1 wherein the predetermined sequence is the numerical order of the letters of the alphabet.

* * * * *